Dec. 30, 1952         P. AUDEMAR         2,623,501
PISTON FOR FLUID PRESSURE CYLINDERS
Filed March 1, 1948         2 SHEETS—SHEET 1
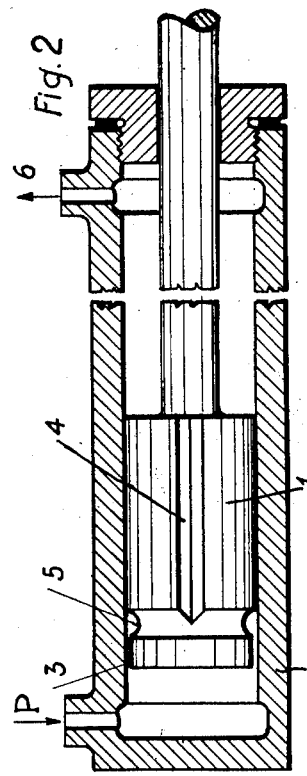
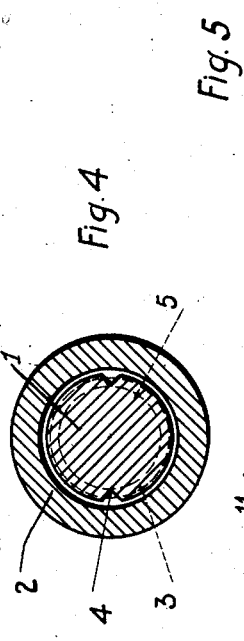
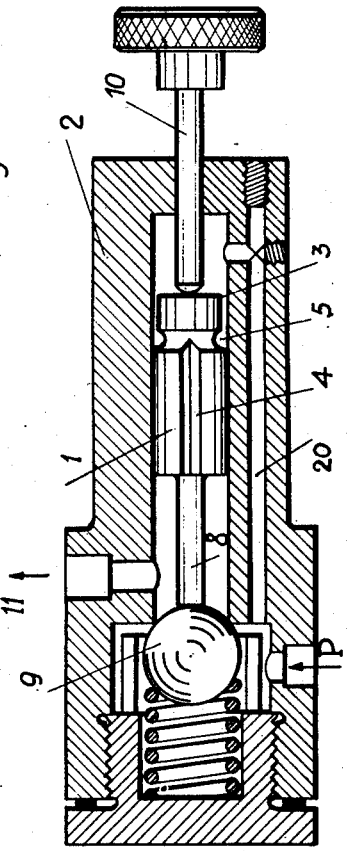
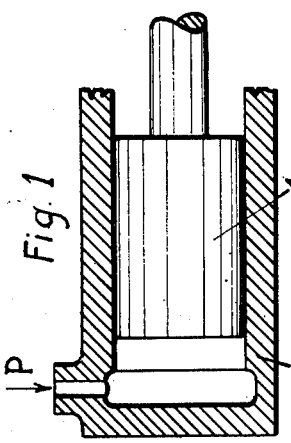
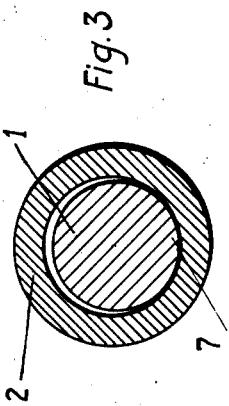
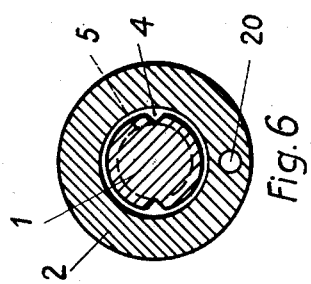
INVENTOR
PIERRE AUDEMAR
BY Otto Munk
HIS ATTY

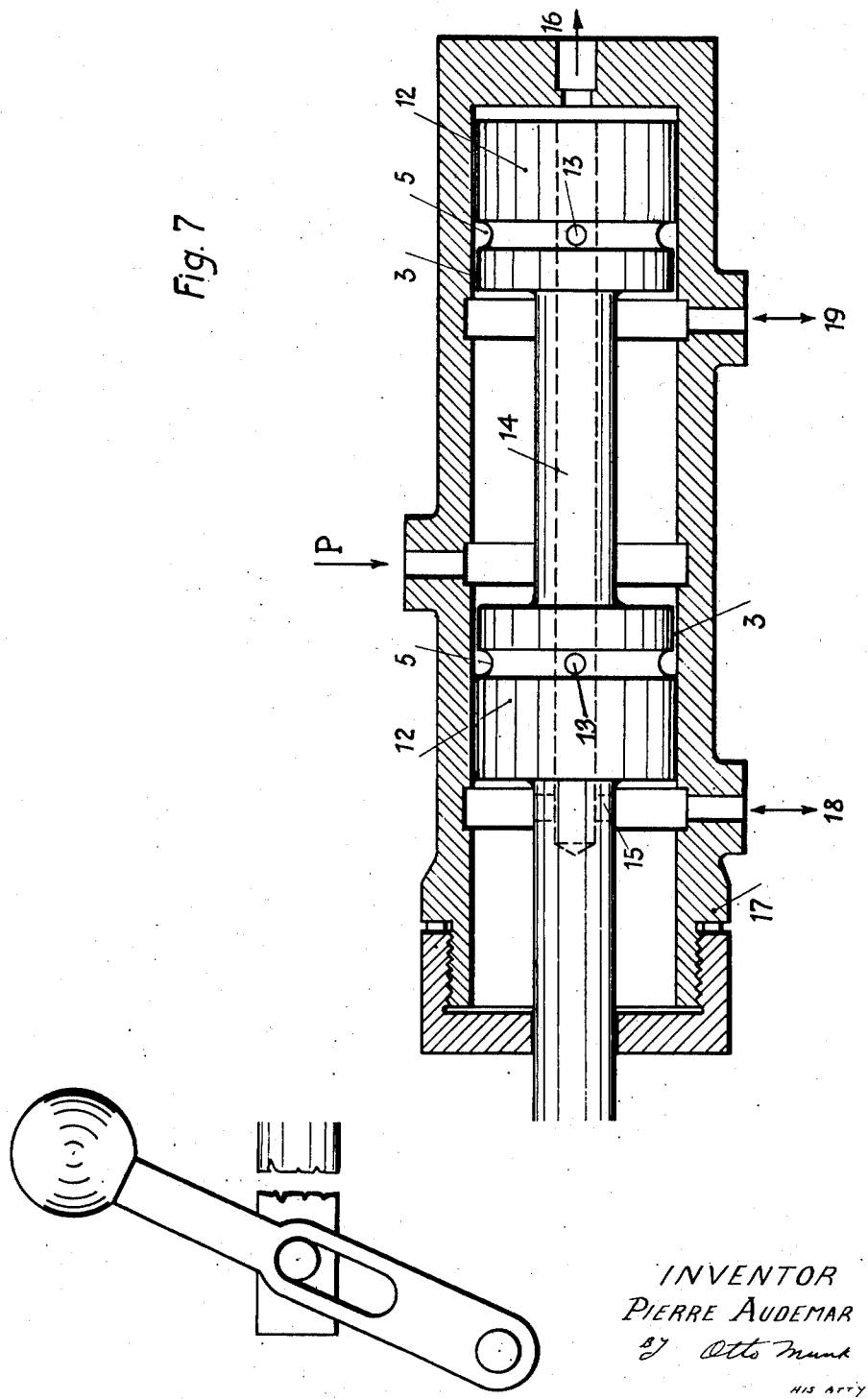

Patented Dec. 30, 1952

2,623,501

UNITED STATES PATENT OFFICE 2,623,501

PISTON FOR FLUID PRESSURE CYLINDERS

Pierre Audemar, Villesnes, France, assignor to Société Olaer Marine, Paris, France, a company of France Application March 1, 1948, Serial No. 12,305
In France September 28, 1946

Section 1, Public Law 690, August 8, 1946
Patent expires September 28, 1966

6 Claims. (Cl. 121—1)

The present invention relates to pistons for hydraulic or pneumatic fluid pressure cylinders in which there is high fluid pressure acting on the working face or faces of the piston.

It is known that in fluid pressure cylinders in which the pressures of the working fluid such as a gas or liquid acting on the working face or faces of a not well centered piston are very high, the pressure fluid which may leak between a circumferential portion of the piston and a corresponding portion of the inner cylinder wall into the space behind the piston when the same is at rest will press the piston against a portion of the inner wall of the cylinder so as to destroy, in the case of a pressure fluid such as oil, the oil film between piston and cylinder, thus creating a resistance or additional friction which constitutes a substantial loss of energy and requires a substantial increase of power to displace the piston along the cylinder wall.

It is the object, therefore, of the present invention to provide an improved piston structure for fluid pressure cylinders which greatly reduces the risk of the piston being pressed against the cylinder wall by the pressure fluid leaking between a circumferential portion of the piston and cylinder into the space behind the piston when the same is at rest.

The accompanying drawings show as examples three embodiments of the invention.

Fig. 1 shows an axial section of a jack or similar servo-motor built in the usual way;

Fig. 2 is a similar axial section of a jack constructed according to the invention;

Fg. 3 is a transversal section showing more or less diagrammatically the phenomenon that takes place in the ordinary jack shown in Fig. 1, when the piston is submitted to a very high pressure;

Fig. 4 is a transversal section through the piston of Fig. 2;

Fig. 5 is an axial section of a second embodiment of the invention applied to a selector valve;

Fig. 6 is a transversal section of the piston and cylinder shown in Fig. 5;

Fig. 7 shows the application of the invention to a slide valve.

Referring first to Figs. 1 and 3, one sees a piston 1 working in a cylinder 2. Under the effect of the high pressure arriving in P, the piston tends to stick against the wall of the cylinder 2 and takes finally the eccentric position shown in Fig. 3, in which the lubricant film is destroyed in the zone 7.

In the first embodiment of the invention, shown applied to a jack or servo-motor in Figs. 2 and 4, 1 still indicates the piston and 2 the cylinder. According to the invention, the part or segment 3 of the piston on the high pressure side is of relatively reduced diameter with respect to the remaining part or segment of the piston located on the low pressure side. A peripheric groove 5 is provided between the two parts or segments, while passages 4, provided in the periphery of the remaining part along directrixes thereof establish a communication between the groove 3 and the low pressure side of the jack provided with the exhaust 6. As shown in Fig. 4, with such an arrangement, the piston is well centered and the risk of sticking is completely eliminated. One must note that, for the clarity of the drawings, the difference between the diameter of the two segments of the piston has been voluntary exaggerated.

Figs. 5 and 6 show a balancing piston designed according to the present invention. In this embodiment, the admission of the fluid under high pressure at P is controlled by a ball valve 9 and the exhaust is at 11.

The fluid under high pressure reaches the right hand side face of the piston 1 through a conduit 20; 10 indicates the manual control of the balancing system and 8 an interior piston-rod acting directly on the ball 9.

In the embodiment of Fig. 7, the invention is shown applied to a selector valve or distributor having a double piston.

The fluid under high pressure arrives at P. The orifices 18 and 19 are set either for the admission or for the exhaust through 16. An axial passage 14 is established which provides a communication between the two outer faces 12 of the double piston. The two grooves 5 communicate with this axial passage 14 through radial holes 13, while radial holes 15 establish a communication between the left hand side end of said axial passage 14 and the left hand low pressure side 17.

What I claim is:

1. The combination with a cylinder-piston device having a high fluid pressure side and a low pressure side: of means to prevent the piston from being pressed against a portion of the inner wall of the cylinder under the action of the radial components of the fluid pressure applied on the high pressure side of the device; said means comprising in the piston a segmental portion of relatively reduced transversal section and relative fluid-tightness on the high pressure side, a segmental portion of normal transversal section on the low pressure side, a peripheric groove between said two portions and a passage or passages establishing a communication between said groove and the low pressure side of the device.

2. In a cylinder-piston device having a high fluid pressure side and a low pressure side a piston comprising: a segment of relatively reduced transversal section on the high pressure side to establish a relative tight connection with the inner periphery of the cylinder; a segment of normal transversal section on the low pressure side to guide the piston along the axis of the cylinder; a groove forming the joint between these two segments; and a free communication between said groove and the low pressure side of the device.

3. The combination with a cylinder having a median-high fluid pressure space and two low pressure spaces at each end of a double piston each part of which is subdivided into two segmental parts of slightly different diameters by an annular intermediate groove, the parts of larger diameter being tightly fitted in said cylinder and the parts of smaller diameter having a relative fluid-tightness, said parts of the smaller diameter facing each other in said median-high fluid pressure space; and an axial passage, provided through the double piston, establishing a communication between said two low pressure spaces; and radial orifices establishing a communication between said axial passage and said two grooves.

4. A piston for hydraulic or pneumatic fluid pressure cylinders, comprising an extension on the working face of the piston, said extension being of slightly reduced diameter with respect to that of said piston so as to have a loose fit in the cylinder, and means to establish communication between the space around said extension and the space at that side of said piston remote from said extension, whereby any fluid leaking around said extension is prevented from leaking between the piston and the inner wall of the cylinder when the piston is at rest.

5. A piston for hydraulic or pneumatic fluid pressure cylinders, comprising an extension on the working face of said piston, said extension being of slightly reduced diameter with respect to that of said piston so as to have a loose fit in the cylinder, an annular groove provided on said extension adjacent said working face, and at least one longitudinal groove formed in the wall of said piston to establish communication between said annular groove and the space at that side of said piston remote from said extension, whereby any fluid leaking around said extension into said annular groove is prevented from leaking between the piston and the inner wall of the cylinder when the piston is at rest.

6. A piston for hydraulic or pneumatic fluid pressure cylinders, comprising an extension on the working face of the piston, said extension being of slightly reduced diameter with respect to that of said piston so as to have a loose fit in the cylinder, an annular groove provided on said extension adjacent said working face, an axial bore provided in the face of said piston opposite its working face, and at least one radial passage leading from said annular groove to said axial bore, whereby any fluid leaking around said extension into said annular groove will escape through said radial passage and said axial bore when the piston is at rest.

PIERRE AUDEMAR.

REFERENCES CITED

The following references are of record in the file of this patent:

UNITED STATES PATENTS

| Number | Name | Date |
|---|---|---|
| 408,653 | Davis | Aug. 6, 1889 |
| 1,339,939 | Alter | May 11, 1920 |
| 1,901,772 | Pfau | Mar. 14, 1933 |
| 1,908,718 | Williams | May 16, 1933 |
| 2,291,243 | Levy | July 28, 1942 |